April 25, 1967

L. M. BREWER ETAL 3,315,570

PRESSURE RELIEVING MEANS

Filed Jan. 7, 1965

INVENTORS
Lee M. Brewer,
BY Robert P. Rohde, &
William B. Thompson
W.S. Pettigrew
ATTORNEY

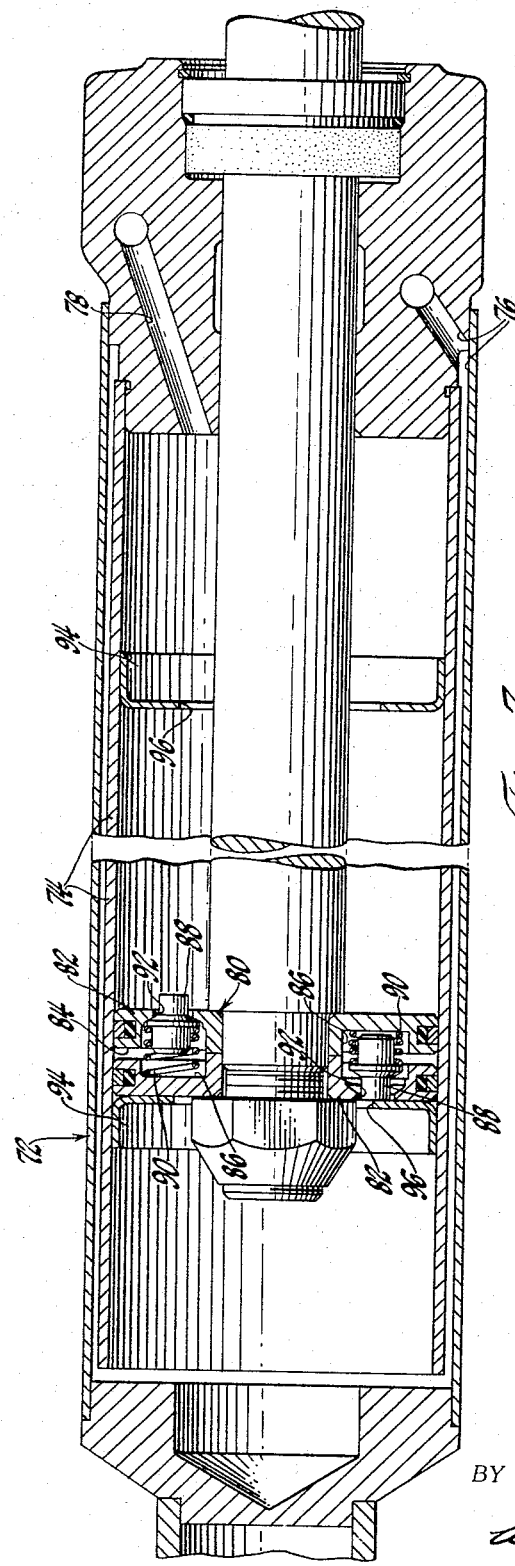

United States Patent Office 3,315,570
Patented Apr. 25, 1967

3,315,570
PRESSURE RELIEVING MEANS
Lee M. Brewer and Robert P. Rohde, Saginaw, and William E. Thompson, Frankenmuth, Mich., assignors to General Motors Corporation, Detroit, Mich., a corporation of Delaware
Filed Jan. 7, 1965, Ser. No. 423,974
6 Claims. (Cl. 91—401)

This invention relates to pressure relieving means for fluid servo systems and more particularly to adjustable pressure relieving means for a vehicle power steering gear.

It is commonplace to provide pressure relief valves in vehicle power steering systems for causing failure of system pressure when that pressure reaches a predetermined maximum. The provision of such valves is of course quite desirable in that, while allowing sufficient pressurization for normal driving or parking maneuvers, they prevent excessive overloading or wear of steering linkage parts, hoses, etc., when the predetermined maximum pressure is reached as a result of high output load conditions, as for example where the steered wheels are sought to be turned into a curb. However, as such relief valve arrangements are directly responsive only to a preset system pressure, they do not comprehend other steering conditions where pressure relief may be desirable. For example, during the frequent turning of the vehicle wheels to their maximum deflected position against the chassis stops as during parking or otherwise, it often happens that the operator inadvertently continues to pressure-load the fluid booster motor and vehicle wheels further against the chassis stops. Even though the predetermined maximum system pressure may never be reached during such conditions, unnecessary overstressing and wear of the steering linkage or other parts nevertheless results. Additionally, the useless continuous fluid supply to the booster motor during these conditions unnecessarily robs the fluid system of the pressurized flow that may be needed for other operating components or accessories in the vehicle.

By this invention, the difficulties described above are eliminated through the incorporation of pressure relieving means directly in the movable piston of the steering gear, which means are operable to relieve the pressure build-up from one side of the piston to the other when the piston reaches an end-stroke position corresponding to the maximum deflected position of the vehicle wheels against the vehicle chassis stops. Sufficient pressure is thereby always available to steer the vehicle up to maximum wheel deflection, at which point, regardless of the system pressure reached, relieved fluid flow is afforded across the piston and throughout the entire fluid system.

As is apparent, in order to attain the desired objectives, pressure relief must occur precisely at those positions of the piston at which the vehicle wheels engage the chassis stops. Obviously, to adjust the pressure relieving means in assembly for each and every individual steering gear installation to account for the normal linkage geometry variations would entail great amounts of time and expense. By this invention, however, the pressure relieving means are so arranged as to be automatically adjustable upon initial use of the steering gear in turning the vehicle wheels to the chassis or other limit stops, whereupon the pressure relieving means are preset for pressure relief upon subsequent turning of the wheels to these positions.

The primary object of this invention is to provide pressure relieving means for the reciprocable piston of a fluid servo system, the pressure relieving means being automatically adjustable for pressure relief at a predetermined end-stroke position of the piston. Another object of this invention is to provide pressure relieving means for a vehicle power steering gear, the pressure relieving means being automatically adjustable under initial movement of the booster motor piston to the maximum deflected position of the vehicle wheels so as to be preset for pressure relief upon subsequent deflection of the wheels to these positions.

These and other objects, features and advantages of the invention will be readily apparent from the following specification and drawings wherein:

FIGURE 3 is a sectional view of a vehicle power steering gear fluid motor including another embodiment of the pressure relieving means of this invention.

Figures 1, 2:
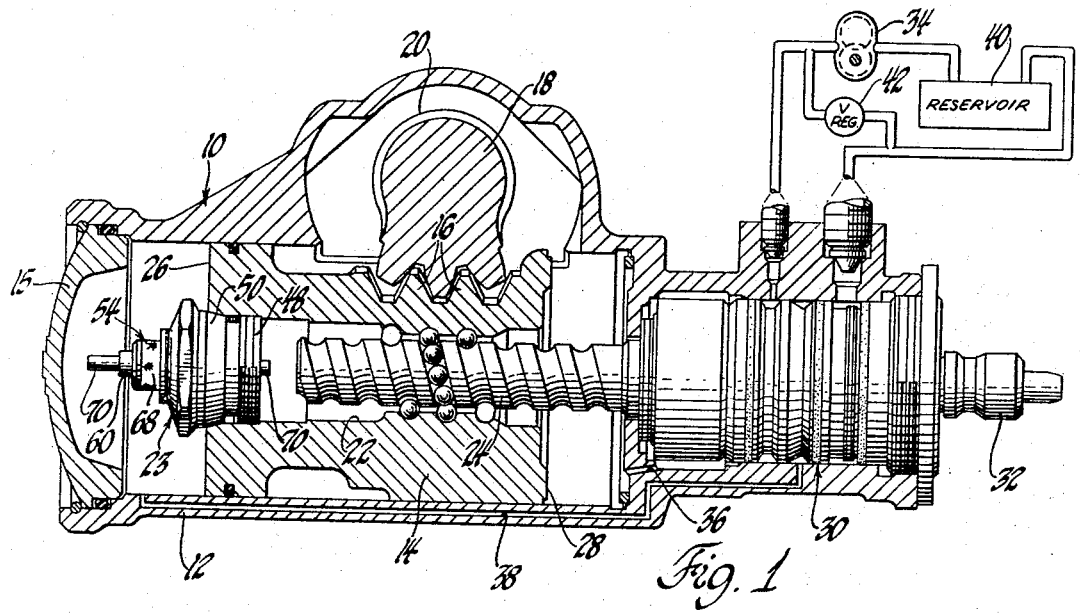
FIGURE 1 is a diagrammatic view, partially in section, of an integral vehicle power steering gear including pressure relieving means according to this invention.
FIGURE 2 is an enlarged sectional view of a portion of FIGURE 1.

Referring now particularly to FIGURES 1 and 2 of the drawings, the inventive pressure relieving means will first be described as being applied in a so-called integral vehicle power steering gear. The details of structure and operation of such an integral steering gear may be had upon reference to Zeigler et al. 3,022,772, issued Feb. 27, 1962. Proceeding, however, with a general description, a housing 10 has formed in a portion thereof a booster cylinder 12 receiving for reciprocation therewithin a ball-nut piston 14. An end cover 15 closes the left-hand end of the cylinder. Piston 14 has formed at one side thereof a series of rack teeth 16 meshed with a sector portion 18 of a cross shaft 20 journalled within housing 10 and being operably connected outside the housing with the pitman arm or similar component of the vehicle steering linkage. Piston 14 is further provided with a central axial bore 22 closed at one end thereof by an end cap 23 and having a helically grooved portion through which extends a steering worm 24. A conventional recirculating ball arrangement operably interconnects the worm with the piston. Piston 14 is reciprocable to rotate cross shaft 20 in either direction from the more or less centered position shown either under manual rotation of worm 24, or upon the application of fluid pressure to either the left- or right-hand side 26 or 28 of the piston. For controlling the application of such fluid pressure to the piston, there is provided integrally within housing 10 a control valve indicated generally at 30, from the right-hand end of which extends one end of a stub shaft 32 adapted to be suitably interconnected with a steering shaft carrying the steering wheel or similar control means for the vehicle operator. The operating and structural details of valve 30 will be readily apparent upon reference to the above-noted Ziegler et al. patent, but generally, the valve is responsive to rotation of stub shaft 32 in a selected direction to supply pressure from a fluid pump 34 through one of two passages 36 and 38 in housing 10 to one side of piston 14, and concurrently permit exhaust from the other side of the piston through the other passage to the system reservoir 40. For example, to power steer the vehicle wheels in one direction through the rotation of shaft 20 clockwise, valve 30 is caused to pressurize passage 36 and the right-hand side 28 of piston 14, and concurrently permit exhaust from the cylinder chamber respective to the left-hand side 26 through passage 38 to reservoir. A system relief valve 42 is connected across the conduits leading from the pump and to the reservoir to permit direct flow therebetween when pump pressure reaches a predetermined maximum.

Referring to FIGURE 2, end cap 23 is centrally recessed at 46 and is tightly threadedly engaged at 48 within piston 14 sufficiently to engage like chamfer surfaces 50 on the end cap and on the piston. In the body of the end cap there is provided a central bore 52 opening to the recess 46 and receiving a pair of like pressure relief valve assemblies 54 separated by a centrally apertured spacer 56 and retained within the end cap by an end flange thereof. Each assembly 54 includes a body member 58 centrally bored to slidably receive a hollow valve spool 60. A coil compression spring 62 seats at either end on a respective valve spool to bias the spools oppositely of each other to seat at 64 on the body members 58. Body members 58 each include a transverse bore 66 opening to the central bore thereof, and fine mesh annular screens 68 prevent accumulation within the body members of particles of a size sufficient to hamper proper seating of spools 60. Within the open end of each spool 60 is press-fitted a pin plunger 70, the plungers being slidable within the spools under sufficient force as will be hereinafter described.

It is apparent that in one full turn position of the vehicle wheels, piston 40 will be located in a rightward nominal end-stroke position whereat the end cap 23 will lie proximate the left-hand end of worm 24, and in the other full turn position of the vehicle wheels, piston 14 will be displaced to a leftward nominal end-stroke position whereat end cap 23 will lie proximate end cover 15. The exact positions of the piston during these conditions will of course vary from vehicle to vehicle with the normal variations that occur in the assembly of linkages, etc. Further, it is normal that the full allowable travel of piston 14 within cylinder 12 be somewhat greater than that between its two nominal end-stroke positions whereat the vehicle wheels engage the chassis stops. Therefore, the length of each plunger 70 is fixed in practice to take account of such of these variations as are experienced, and the plungers are of course installed to have the major portion of their length initially extending from the spools 60.

In operation, after full assembly of the steering system within the vehicle, a factory attendant may employ the steering wheel to oscillate the vehicle wheels between their two maximum deflected positions against the respective chassis stops, either manually or with the aid of booster pressure applied to piston 14. Firstly, the piston may be displaced toward end cover 15 until the free end of the left-hand plunger 70 engages the end cover, whereupon left-hand spool 60 will be pushed to the right against spacer 56. Thereafter, with the spool 60 thus restrained, the piston is further displaced leftwardly under sufficient force to its end-stroke position whereat the vehicle wheels engage their respective chassis stops. The left-hand plunger 70 is consequently forced inwardly of the spool 60 a distance $d$ corresponding generally to the distance the piston traverses between the point of engagement of the plunger 70 with the end cover and the end-stroke position of the piston. After a subsequent slight rightward displacement of piston 14 from the end-stroke position to allow the left-hand spool 60 to be reseated, there is defined the exact position of the piston at which the spool has been automatically preset for pressure relief. Since this presetting thus also comprehends the stroke of left-hand spool 60, this spool is actually set to relieve somewhat prior to the reaching of the nominal end-stroke position used in presetting the spool. In actual pressure relief at the leftward end-stroke position, any substantial booster pressure applied to the right-hand side 28 of piston 14 is relieved through the sequence of the preset unseating of the left-hand spool 60, and the subsequent unseating to the left of right-hand spool 60 against spring 62 under a minimum pressure differential between the right- and left-hand sides of the piston. Flow is thereby permitted through right-hand bore 66, through the body members 58, and through left-hand bore 66. While this minimum pressure differential is maintained, direct exhaust is thus directed through the piston and through passage 38 to reservoir.

Similar operations of course obtain when the right-hand plunger 70 is to be preset for pressure relief. In this case, initial deflection of the vehicle wheels and corresponding rightward displacement of the piston 14 engages the right-hand plunger 70 with the end of worm 24, and the plunger is pushed inwardly of the right-hand spool 60 until the vehicle wheels engage the chassis stops, thereby presetting the right-hand spool in the manner described above. In subsequent pressurization of the piston 14 toward the rightward end-stroke position, the right-hand spool 60 is unseated by worm 24, whereupon the pressure differential over the piston in favor of the left-hand side 26 thereof will unseat the left-hand spool against spring 62 and permit direct exhaust through the piston and through passage 36 to reservoir.

It will be apparent that when it is desired to employ positive stops directly between piston 14 and cylinder 12 in lieu of the chassis stops, similar presetting plunger conditions occur as those just described.

In FIGURE 3, another embodiment of the adjustable pressure relieving means of this invention is shown as applied in a typical steering linkage booster motor designated generally as 72. The details of structure and operation are of course well-known by those skilled in the art, but generally the motor includes a cylinder 74 having defined therein a pair of supply and exhaust passages 76 and 78, and a shafted piston 80 reciprocable within the cylinder under fluid pressure to operate directly on the steering linkage of the vehicle. Piston 80 includes a pair of opposite plates 82 secured to the piston shaft and each being suitably sealed about their periphery against the cylinder wall and defining therebetween an annular passage 84. A pair of diametrically opposite recesses 86 open to passage 84 each receive a pressure relief valve spool 88 adapted to be seated on a respective plate under the force of a coil compression spring 90. When seated, each spool 88 closes a relief port 92 opening from a recess 86 to a respective side of the piston.

A pair of annularly flanged stop members 94 are each press-fitted within cylinder 74 adjacent a respective end thereof, and each includes a large central aperture 96. As with the integral steering gear of the first embodiment, stop members 94 are initially installed within cylinder 74, in this case sufficiently toward the center of the cylinder, so as to take into account vehicle steering linkage installation variations. After installation of motor 72 in the vehicle, piston 80 may be reciprocated between its opposite nominal end-stroke positions corresponding to the maximum deflection of the steered vehicle wheels against the respective chassis stops. When approaching the leftward end-stroke position of the piston, as shown, the lower spool 88 is engaged with the left-hand stop member 94 so as to be unseated against spring 90. The stop member is then preset by being pushed to the left by the piston until reaching the leftward end-stroke position. Again, this presetting operation comprehends the stroke of the lower spool 88 so that upon subsequent movement of piston 80 toward the preset stop member 94, initial pressure relief will occur somewhat prior to reaching the end-stroke or engagement of the vehicle wheels with the chassis stops. In actual pressure relief, pressurization of the piston 80 to the left causes the lower spool 88 to be unseated by the left-hand stop member 94 as above, whereupon the pressure differential across the upper spool 88 and between the right-hand side of the piston and passageway 84 serves to unseat the upper spool against its spring 90 to permit direct exhaust through the piston and through passage 76 to reservoir. Pressure relief continues as long as the predetermined minimum pressure differential is maintained across the upper spool. Similarly, the right-hand stop member 94 is preset by initial displacement of piston 80 to its rightward end-stroke position, and upon subsequent movement of the piston thereto to unseat the upper spool 88, the lower spool is unseated by the pressure differential across the piston to permit direct exhaust from the left-hand side thereof to passage 78 and to reservoir.

It is apparent that according to the arrangement of the second embodiment shown in FIGURE 3, the point of initial pressure relief through spools 88 occurs significantly prior to actual engagement of the steered wheels with the chassis stops, due to the rather large stroke of the spools. This may be desirable in truck or other installations where wheel and linkage jounce due to rough roads or otherwise would tend to engage piston 14 with the preset stop members 94 to relocate the same even after pressure relief has occurred.

Thus new and improved pressure relieving means are provided.

We claim:

1. In a servo system, the combination comprising, a power cylinder, a piston in said cylinder reciprocable to and from a predetermined end-stroke position, means controlling pressure supply and exhaust to and from opposite sides of said piston for said reciprocation thereof, pressure relief means in said cylinder operable to relieve pressure from one side of said piston to the other, adjustable actuating means operable to actuate said pressure relief means, and means operable upon movement of said piston to said end-stroke position thereof to adjust said actuating means for pressure relief upon subsequent movement of said piston to said end-stroke position thereof.

2. In a servo system, the combination comprising, a power cylinder, a piston in said cylinder reciprocable between predetermined opposite end-stroke positions, means controlling pressure supply and exhaust to and from opposite sides of said piston for said reciprocation thereof, pressure relief means carried by said piston operable to relieve pressure from one side of said piston to the other, cooperable adjustable actuating means on said piston and on said cylinder engageable to actuate said pressure relief means, and means operable upon movement of said piston to each of said end stroke positions thereof to adjust said actuating means for engagement upon subsequent movement of said piston to said end-stroke positions thereof.

3. In a servo system, the combination comprising, a power cylinder, a piston in said cylinder reciprocable between predetermined opposite end-stroke positions, means controlling pressure supply and exhaust to and from opposite sides of said piston for said reciprocation thereof, pressure relief valve means carried in said piston and being movable between an open position relieving pressure from one side of said piston to the other and a closed position, cooperable adjustable actuating means on said valve means and on said cylinder engageable to move said valve means between said positions thereof, and means operable upon movement of said piston to each of said end-stroke positions thereof to adjust said actuating means for engagement upon subsequent movement of said piston to said end-stroke positions thereof.

4. In a servo system, the combination comprising, a power cylinder, a piston in said cylinder reciprocable between predetermined opposite end-stroke positions, means controlling pressure supply and exhaust to and from opposite sides of said piston for said reciprocation thereof, pressure relief valve means carried in said piston and being movable between an open position relieving pressure from one side of said piston to the other and a closed position, and cooperable actuating means on said piston and on said cylinder engageable to move said valve means between said positions thereof, said actuating means including releasably held adjusting plunger means slidable under predetermined force from a nonadjusting position to any one of a plurality of adjusting positions, initial movement of said piston to each of said end stroke positions thereof sliding said plunger means from said nonadjusting position to a releasably held position adjusting said actuating means for engagement upon subsequent movement of said piston to said end-stroke positions thereof.

5. In a vehicle power steering gear, the combination comprising, a power cylinder, a piston in said cylinder reciprocable between opposite end-stroke positions, means controlling pressure supply and exhaust to and from opposite sides of said piston for said reciprocation thereof, a pair of pressure relief valves carried in said piston, each being movable between an open position for relieving pressue from one side of said piston to the other and a closed position, and a pair of stop members releasably held within said cylinder adjacent opposite ends thereof for actuation of said valves, each of said stop members being slidable within said cylinder under predetermined force to a plurality of adjusted positions, initial movement of said piston to each of said end-stroke positions thereof sliding said stop members each to an adjusted position presetting said stop members for actuation of said valves upon subsequent movement of said piston to said end-stroke positions thereof.

6. In a vehicle power steering gear, the combination comprising, a power cylinder, a piston in said cylinder reciprocable between predetermined opposite end stroke positions, said piston having a helically grooved central axial bore, a steering worm extending into said bore and being interconnected with said piston, means controlling pressure supply and exhaust to and from opposite sides of said piston, a pair of pressure relief valves carried in an end wall of said piston, each being movable between an open position for relieving pressure from one side of said piston to the other and a closed position, a pair of plungers each being releasably held in a respective one of said relief valves and being slidable therein under predetermined force to a plurality of adjusted positions, and abutment means on said worm and on said cylinder adapted to be engaged by said plungers to actuate said valves, initial movement of said piston to each of said end-stroke positions thereof engaging said plungers with said abutment means to adjust said plungers each to a position presetting said plungers for actuation of said valves upon subsequent movement of said piston to said end-stroke positions thereof.

References Cited by the Examiner

UNITED STATES PATENTS

| | | | |
|---|---|---|---|
| 2,948,263 | 8/1960 | Royer | 91—422 X |
| 3,059,622 | 10/1962 | Sexauer | 91—401 |
| 3,092,083 | 6/1963 | Sheppard | 91—401 X |
| 3,181,429 | 5/1965 | Washbond | 91—401 |

MARTIN P. SCHWADRON, *Primary Examiner.*

P. T. COBRIN, *Assistant Examiner.*